United States Patent
Aoki

(10) Patent No.: US 8,243,448 B2
(45) Date of Patent: Aug. 14, 2012

(54) ELECTRONIC APPARATUS

(75) Inventor: Shinji Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/551,887

(22) Filed: Sep. 1, 2009

(65) Prior Publication Data

US 2010/0079947 A1    Apr. 1, 2010

(30) Foreign Application Priority Data

Sep. 29, 2008   (JP) ................. 2008-251437

(51) Int. Cl.
*H05K 7/20* (2006.01)
*G06F 1/20* (2006.01)

(52) U.S. Cl. ............. 361/697; 361/679.47; 361/679.48; 361/679.54; 361/679.55; 361/695; 361/703; 361/704; 165/80.3; 165/185

(58) Field of Classification Search ............ 361/679.46–679.51, 679.54–679.56, 690, 694–695, 697, 361/703–704, 709–710; 165/80.2–80.3, 185; 174/16.3

See application file for complete search history.

(56) References Cited

U.S. PATENT DOCUMENTS

| 6,927,978 | B2 * | 8/2005 | Arai et al. ................ 361/695 |
| 7,336,489 | B1 * | 2/2008 | Chen et al. ................ 361/700 |
| 7,345,874 | B2 * | 3/2008 | Cheng et al. ............... 361/695 |
| 7,362,568 | B2 * | 4/2008 | Huang .................. 361/679.48 |
| 7,631,687 | B2 * | 12/2009 | Yang ................... 165/104.33 |
| 7,660,119 | B2 * | 2/2010 | Iikubo .................... 361/697 |
| 7,830,663 | B2 * | 11/2010 | Iikubo .................... 361/697 |
| 7,889,495 | B2 * | 2/2011 | Tachikawa .............. 361/679.48 |
| 7,907,405 | B2 * | 3/2011 | Tachikawa ............... 361/695 |
| 2007/0131383 | A1 | 6/2007 | Hattori et al. |
| 2007/0169920 | A1 * | 7/2007 | Yang .................. 165/104.34 |
| 2008/0253088 | A1 * | 10/2008 | Tracy et al. .............. 361/695 |
| 2008/0266796 | A1 * | 10/2008 | Iikubo .................... 361/697 |
| 2009/0009967 | A1 * | 1/2009 | Nishizawa et al. ......... 361/695 |
| 2009/0180256 | A1 * | 7/2009 | Chao et al. ............... 361/703 |
| 2010/0067195 | A1 * | 3/2010 | Tanaka .................. 361/692 |
| 2010/0073867 | A1 * | 3/2010 | Tachikawa .............. 361/679.48 |
| 2010/0073874 | A1 * | 3/2010 | Tachikawa ............... 361/695 |
| 2010/0073875 | A1 * | 3/2010 | Suzuki et al. .............. 361/695 |
| 2011/0075364 | A1 * | 3/2011 | Ma et al. ................ 361/697 |

FOREIGN PATENT DOCUMENTS

| JP | 2-301192 |   | 12/1990 |
| JP | 2005321287 | A * | 11/2005 |
| JP | 2007-189183 |   | 7/2007 |
| JP | 2008159925 | A * | 7/2008 |
| JP | 2008234346 | A * | 10/2008 |

* cited by examiner

*Primary Examiner* — Robert J Hoffberg

(74) *Attorney, Agent, or Firm* — Staas & Halsey LLP

(57) ABSTRACT

An electronic apparatus includes a casing that includes a vent, with the vent venting dust inside the casing, a heat radiating fin that is housed in the casing and includes an edge portion, a cooling fan that is housed in the casing and cools the heat radiating fin, with the cooling fan including an edge portion that faces the edge portion of the heat radiating fin. The electronic apparatus has a clearance between the edge portion of the heat radiating fin and the edge portion of the cooling fan becomes narrower the further it is from the vent.

6 Claims, 6 Drawing Sheets

ELECTRONIC APPARATUS

CROSS-REFERENCE TO RELATED APPLICATIONS

This application is based upon and claims the benefit of priority from the prior Japanese Patent Application No. 2008-251437 filed on Sep. 29, 2008, the entire contents of which are incorporated herein by reference.

BACKGROUND

1. Field

The embodiment described herein relates to an electronic apparatus that is equipped with a heat radiating fin and a cooling fan.

2. Description of the Related Art

There is known an electronic apparatus in which a heat radiating fin and a cooling fan that cools the heat radiating fin are housed inside a casing. Further, as disclosed in JP-A-2007-189183, for example, there is also known an electronic apparatus in which a dust collecting member for collecting dust is disposed between the heat radiating fin and the cooling fan, and an opening for replacing the dust collecting member is disposed in the casing.

When the heat radiating fin and the cooling fan are disposed in proximity to each other, the area of the heat radiating fin can be enlarged and the heat radiating efficiency of the heat radiating fin is improved. However, it is difficult for dust that has accumulated in the gap between the heat radiating fin and the cooling fan to be removed. Further, when a dust collecting member is disposed between the heat radiating fin and the cooling fan, there is the fear that the dust collecting member will become a drag on the air blown from the cooling fan and lower the heat radiating efficiency of the heat radiating fin. Further, there is the fear that the area of the heat radiating fin will become smaller and the heat radiating efficiency of the heat radiating fin will drop even more as a result of the dust collecting member being disposed.

SUMMARY

According to an aspect of an embodiment, an electronic device includes a casing that includes a vent, with the vent venting dust inside the casing, a heat radiating fin that is housed in the casing and includes an edge portion, a cooling fan that is housed in the casing and cools the heat radiating fin, with the cooling fan including an edge portion that faces the edge portion of the heat radiating fin. The electronic apparatus has a clearance between the edge portion of the heat radiating fin and the edge portion of the cooling fan becomes narrower the further it is from the vent.

Additional aspects and/or advantages will be set forth in part in the description which follows and, in part, will be apparent from the description, or may be learned by practice of the invention.

The above-described embodiments of the present invention are intended as examples, and all embodiments of the present invention are not limited to including the features described above.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF THE PREFERRED EMBODIMENTS

Figure 1:
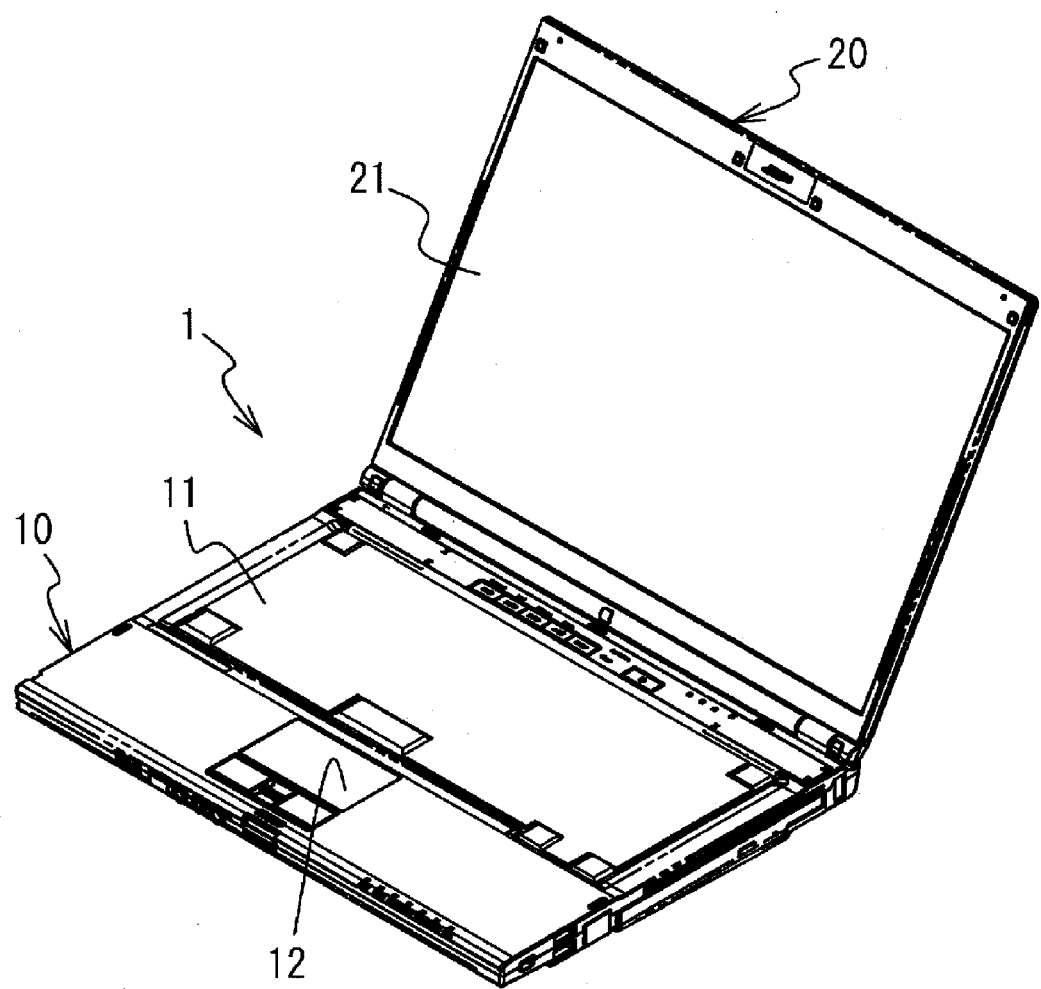
FIG. 1 is a perspective view of a notebook computer.

Reference may now be made in detail to embodiments of the present invention, examples of which are illustrated in the accompanying drawings, wherein like reference numerals refer to like elements throughout.

One embodiment of the present invention will be described below with reference to the drawings.

FIG. 1 is a perspective view of a notebook computer 1. The notebook computer 1 is one example of an electronic apparatus. The notebook computer 1 includes a body casing 10 and a display casing 20. FIG. 1 shows the notebook computer 1 in a state where the casings 10 and 20 have been opened. A keyboard 11 and a pointing device 12 are incorporated into the casing 10. A display 21 is incorporated into the casing 20. The casing 10 is one example of a casing that houses a heat radiating fin and a cooling fan described later.

Figure 2:
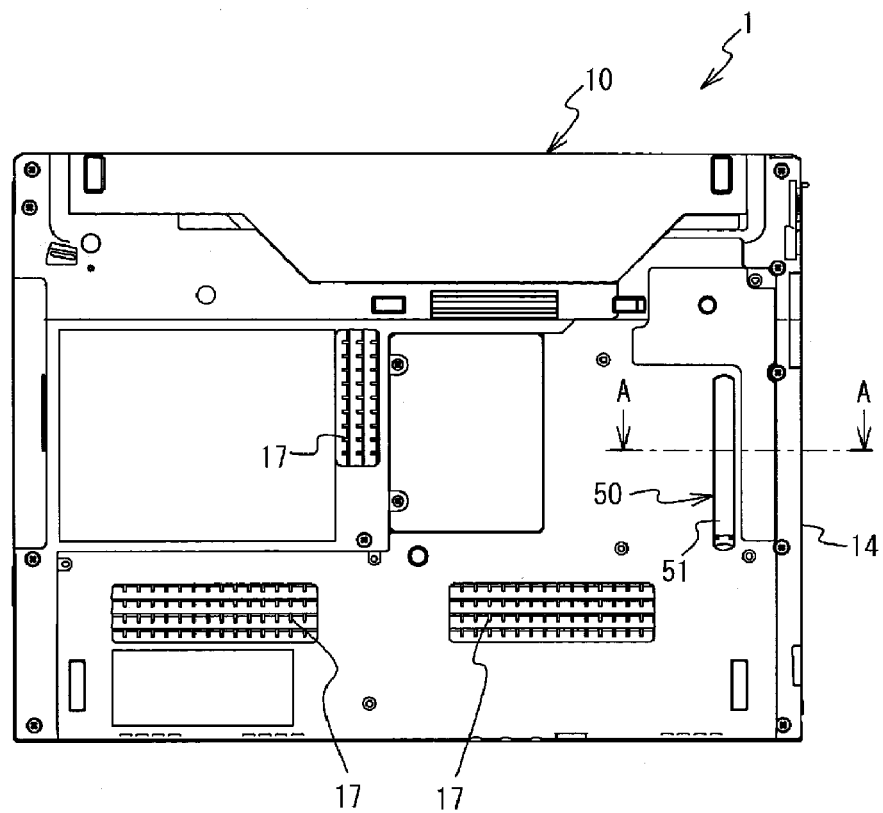
FIG. 2 is a bottom view of a body casing.

FIG. 2 is a bottom view of the casing 10. Air inlets 17 are disposed in plural places on the bottom side of the casing 10. Air is introduced to the inside of the casing 10 from the outside of the notebook computer 1 via the air inlets 17 by the operation of the cooling fan. Further, as shown in FIG. 2, a cover 50 is disposed on the bottom side of the casing 10. Further, an air outlet 14 is formed in one side surface of the casing 10. Air that has been introduced to the inside of the casing 10 is discharged to the outside of the casing 10 from the air outlet 14.

Figure 3:
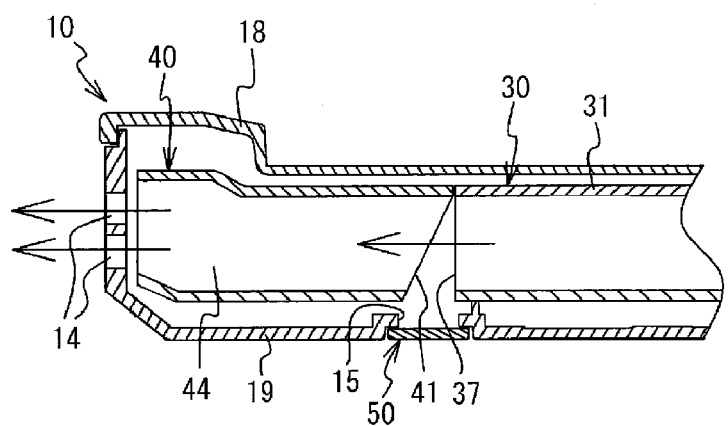
FIG. 3 is a cross-sectional view along line A-A of FIG. 2.

FIG. 3 is a cross-sectional view along line A-A of FIG. 2. As shown in FIG. 3, a cooling fan 30 and a heat radiating fin 40 are housed inside the casing 10 in a state where they face each other. Further, the casing 10 includes an upper wall portion 18 and a lower wall portion 19. The keyboard 11 and the pointing device 12 are disposed in the upper wall portion 18. The lower wall portion 19 serves as a bottom surface of the casing 10. A vent 15 is formed in the lower wall portion 19. The cover 50 is disposed in the vent 15. FIG. 3 shows a simplified view of the cover 50. The vent 15 is formed in the vicinity of a position where the cooling fan 30 and the heat radiating fin 40 face each other. The vent 15 is for venting dust inside the casing 10, and particularly dust adhering to the heat radiating fin 40, to the outside.

Figure 4:
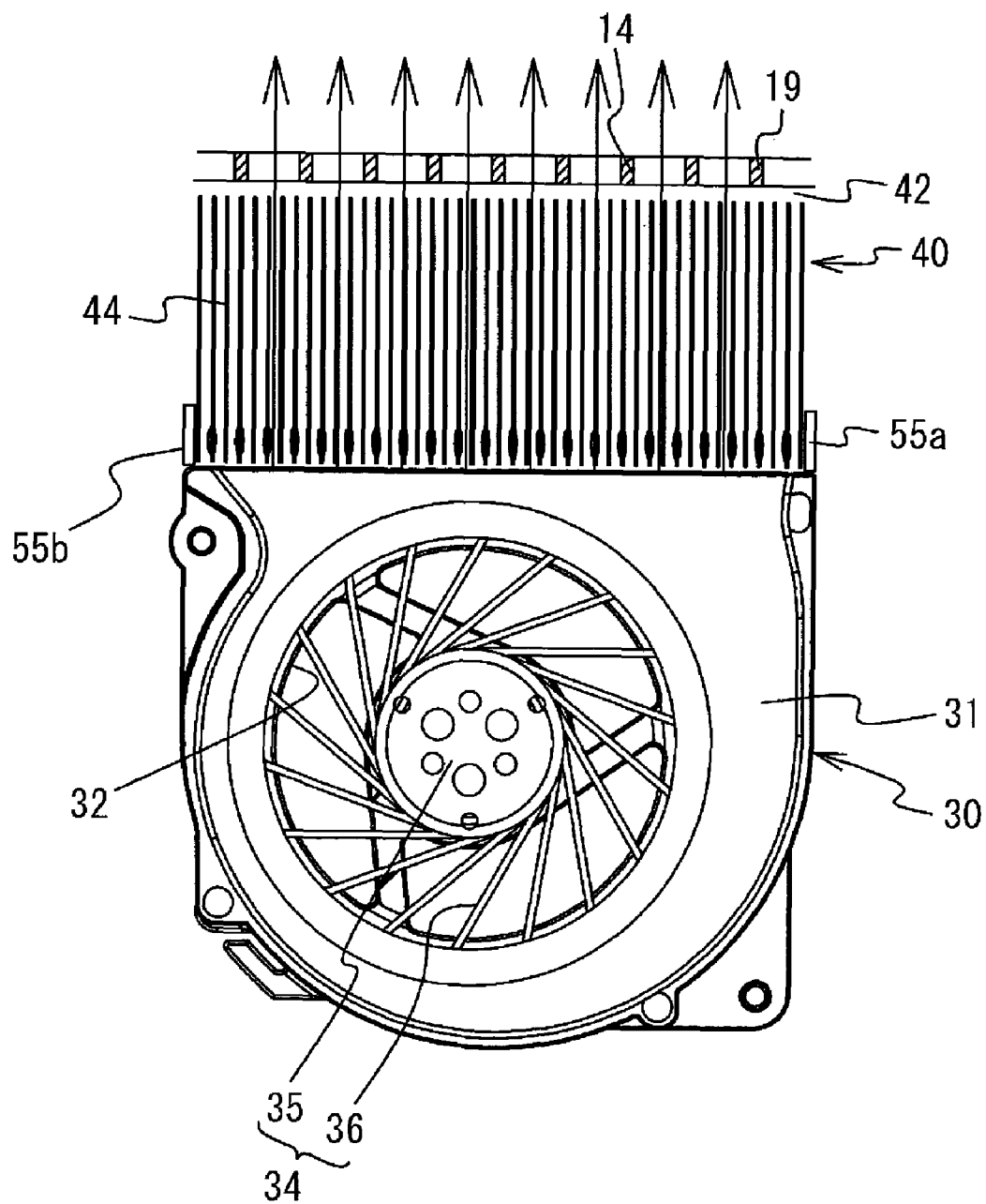
FIG. 4 is a front view of a cooling fan and a heat radiating fin that are housed inside the casing.

FIG. 4 is a front view of the cooling fan 30 and the heat radiating fin 40 that are housed inside the casing 10. It will be noted that FIG. 4 schematically shows a cross section of the lower wall portion 19 in the area around the air outlet 14. The cooling fan 30 includes a housing 31, an air suction-use opening 32 and a fan 34. The housing 31 houses inside the air suction-use opening 32 and the fan 34. The air suction-use opening 32 is formed in the housing 31. Outside air is introduced to the inside of the housing 31 via the air suction-use opening 32. The fan 34 is housed such that it may freely rotate inside the casing 10 and includes a rotor 35 and an impeller 36. Because of the rotation of the fan 34, outside air is introduced to the inside of the housing 31 via the air suction-use opening 32 and is sent toward the heat radiating fin 40.

The heat radiating fin 40 includes plural fins 44 that are disposed parallel to each other. Heat from a central processing unit (CPU) and video chips that are not shown is transmitted to the heat radiating fin 40. The air blown from the cooling fan 30 passes through spaces between the fins 44 and is discharged to the outside of the housing 31 via the air outlet 14. Thus, the heat radiating fin 40 is cooled and heat radiation is promoted.

Figure 5A:
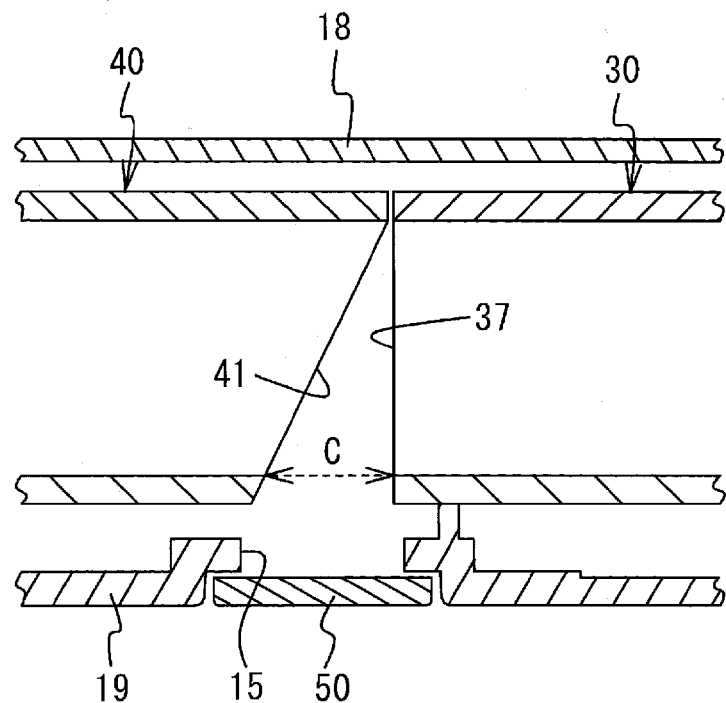
FIG. 5A and FIG. 5B are enlarged views of an area around edge portions that face each other.
Figure 5B:
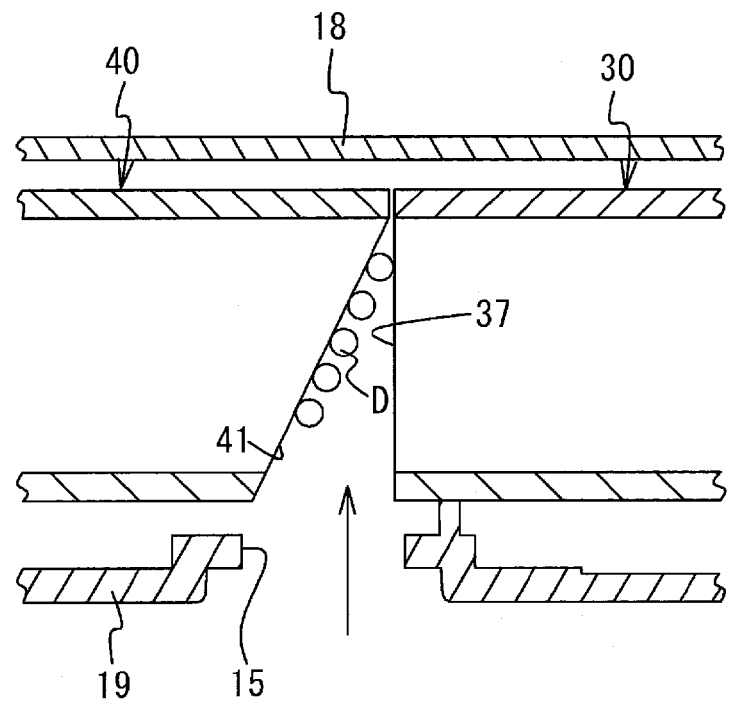

The cooling fan 30 includes an edge portion 37 (shown in FIG. 2). The edge portion 37 is one example of a cooling fan edge portion. The heat radiating fin 40 includes an edge portion 41. The edge portion 41 is one example of an edge portion of the heat radiating fin side. The edge portion 37 and the edge portion 41 face each other. FIG. 5A and FIG. 5B are enlarged views of the area around the edge portions 37 and 41 that face each other. As shown in FIG. 5A, a clearance between the edge portion 37 and the edge portion 41 becomes narrower away from the vent 15. The edge portion 37 is formed along a vertical direction. The edge portion 41 becomes closer to the edge portion 37 away from the vent 15. That is, the edge portion 41 slants so as to become closer to the edge portion 37 away from the vent 15. In other words, a clearance C between the cooling fan 30 and the heat radiating fin 40 is narrower on the far side of the vent 15 (near the upper wall portion 18) than on the near side of the vent 15 (near the lower wall portion 19).

FIG. 5B is an explanatory view of work to remove dust adhering to the edge portion 41. Dust is included in the air that has been introduced to the inside of the casing 10, and this dust adheres to the edge portion 41. FIG. 5B shows dust D adhering to the edge portion 41. When the dust D is left to adhere to the edge portion 41 without being removed, there is the fear that the heat radiating efficiency of the heat radiating fin 40 will drop. Thus, it is necessary for a user to perform work to remove the dust D. The user first removes the cover 50 from the vent 15, inserts a cleaning tool such as a cotton swab in the direction of the arrow through the vent 15 and removes the dust D adhering to the edge portion 41. Thus, a drop in the heat radiating efficiency of the heat radiating fin 40 is controlled.

Further, insertion of the cleaning tool is easy because the clearance C is wider on the near side of the vent 15 than on the far side of the vent 15. Further, it becomes easy to see the dust D adhering to the edge portion 41 because the edge portion 41 slants so as to become closer to the edge portion 37 away from the vent 15. In particular, it becomes easy to see the dust D on the far side of the vent 15.

Further, because the cover 50 that covers the vent 15 is disposed, the air blown by the cooling fan 30 is prevented by the cover 50 attached to the vent 15 from being vented from the vent 15 at times other than during work to remove dust. Thus, a drop in the heat radiating efficiency of the heat radiating fin 40 is controlled.

Figures 6A, 6B, 6C:
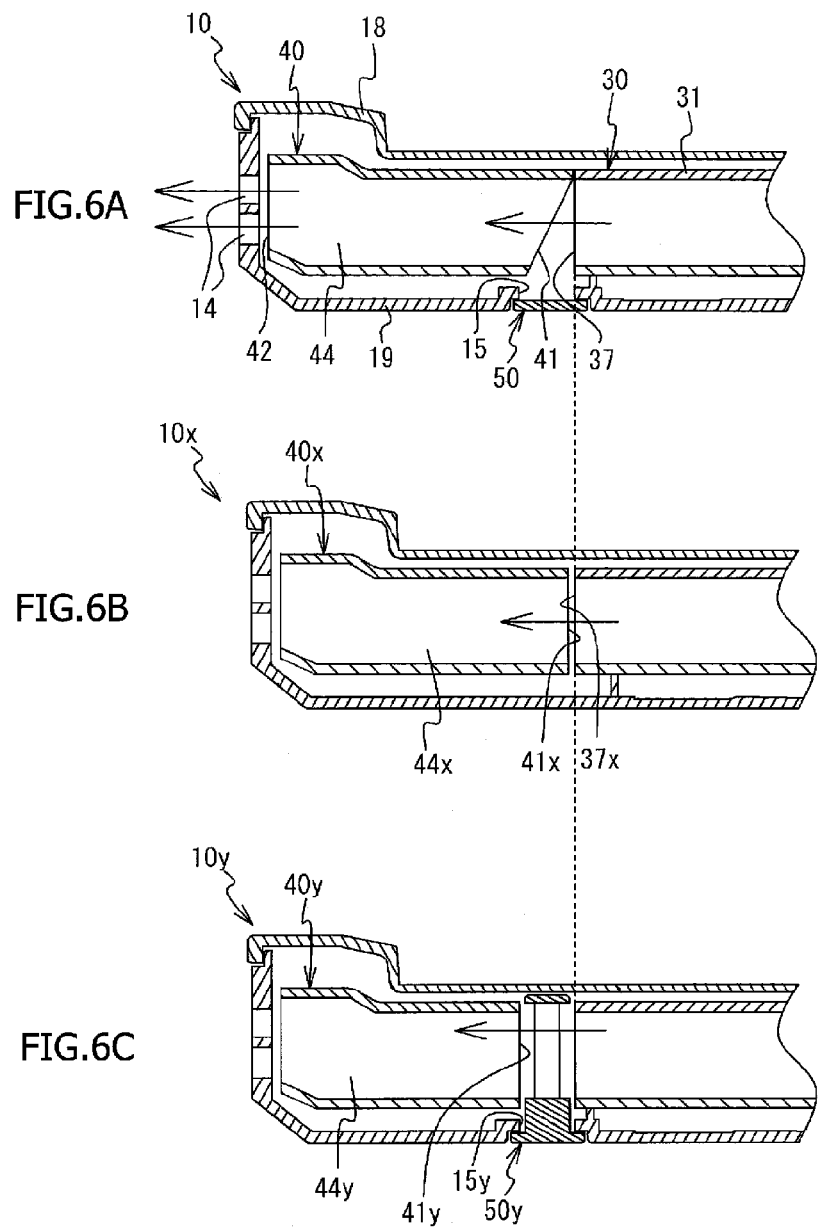
FIG. 6A, FIG. 6B and FIG. 6C are comparative views of the notebook computer pertaining to an embodiment of the present invention and conventional notebook computers.

Next, the notebook computer 1 pertaining to the present embodiment will be compared with conventional notebook computers. FIG. 6A, FIG. 6B and FIG. 6C are comparative views of the notebook computer 1 pertaining to the present embodiment and conventional notebook computers. FIG. 6A is a cross-sectional view of the casing 10 of the notebook computer 1 pertaining to the present embodiment and is the same as FIG. 3. FIG. 6B and FIG. 6C are cross-sectional views of casings 10x and 10y of conventional notebook computers, respectively. It will be noted that similar reference numerals will be assigned to places of the conventional notebook computers that are similar to those of the notebook computer 1 of the present embodiment and that description of those similar places will be omitted.

As shown in FIG. 6B, conventional edge portions 37x and 41x face each other with virtually no clearance therebetween in contrast to the edge portions 37 and 41 pertaining to the present embodiment shown in FIG. 6A. Further, the edge portions 37x and 41x are substantially parallel to each other. As shown in FIG. 6A and FIG. 6B, whereas the edge portion 37 and the edge portion 37x are located in substantially the same position, the conventional edge portion 41x is located in a position closer to the edge portion 37x than the clearance between the edge portion 41 and the edge portion 37. For this reason, the area of each fin 44x of the conventional heat radiating fin 40x is larger than the area of each fin 44 of the heat radiating fin 40 of the present embodiment. Consequently, the heat radiating efficiency of the conventional heat radiating fin 40x is better than that of the heat radiating fin 40 pertaining to the present embodiment.

However, because the edge portion 37x and the edge portion 41x face each other with virtually no clearance therebetween, a cleaning tool for removing dust cannot be inserted between the edge portion 37x and the edge portion 41x. For this reason, there is the problem that dust adhering to the edge portion 41x cannot be removed. When dust is left to deposit on the edge portion 41x without being removed, the fear that this will lead to firing cannot be denied.

As shown in FIG. 6C, a filter 50y that is a dust collecting member is disposed between a cooling fan 30y and a heat radiating fin 40y. The filter 50y traps dust included in air that is blown by the cooling fan 30y. The filter 50y is attachable to and detachable from an opening 15y. The user can remove the filter 50y from the casing 10y and remove dust adhering to the filter 50y. However, during normal use, the filter 50y is disposed between the cooling fan 30y and the heat radiating fin 40y, so the filter 50y becomes a drag on the air blown from the cooling fan 30y. Because of this drag, the heat radiating efficiency of the heat radiating fin 40y drops. Further, space for the filter 50y is ensured by reducing the area of fins 44y. Consequently, the heat radiating efficiency of the heat radiating fin 40y drops even more.

As shown in FIG. 6A, the edge portions 37 and 41 pertaining to the present embodiment are set to have a clearance therebetween that allows insertion of a cleaning tool. Thus, work to remove dust adhering to the edge portion 41 becomes easy. Further, the heat radiating efficiency of the heat radiating fin 40 is ensured because the casing 10, in contrast to the casing 10y, is not disposed with a filter that becomes a drag on the air blown by the cooling fan 30. Further, the area of the fins 44 is ensured and the heat radiating efficiency of the fins 44 improves because the edge portion 41, in contrast to the edge portion 41y, becomes closer to the edge portion 37 away from the vent 15.

Figure 7A:
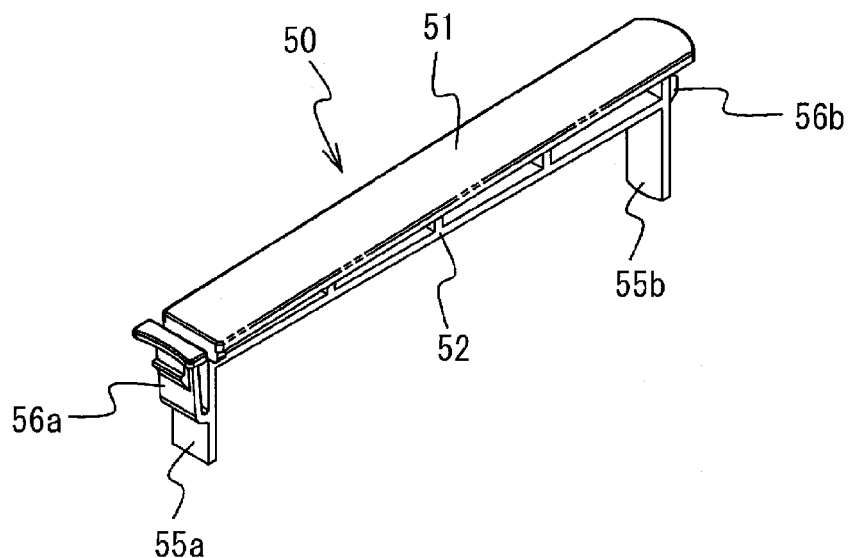
FIG. 7A and FIG. 7B are explanatory views of a cover.
Figure 7B:
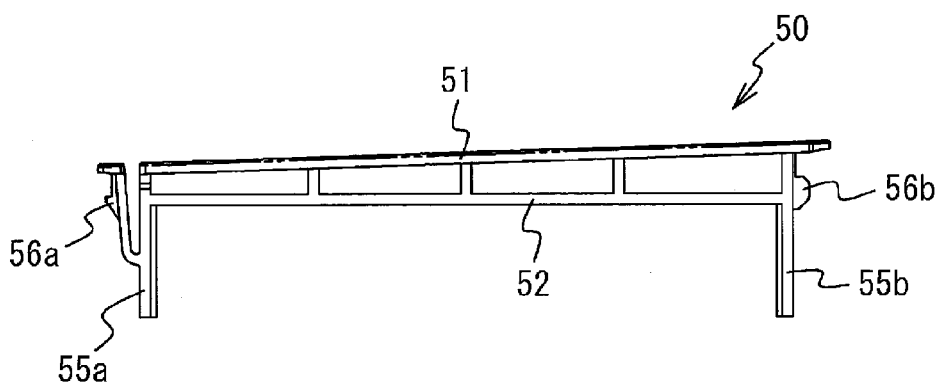

Next, the cover 50 will be described. FIG. 7A and FIG. 7B are explanatory diagrams of the cover 50. FIG. 7A is a perspective view of the cover 50. FIG. 7B is a front view of the cover 50. The cover 50 includes base portions 51 and 52 and guide portions 55a and 55b. The base portions 51 and 52 are formed in thin plate shapes and are disposed along each other. When the cover 50 is inserted into the vent 15, the base portion 51 is exposed from the vent 15. The guide portions 55a and 55b are respectively disposed on both end portions of the base portions 51 and 52. The guide portions 55a and 55b extend substantially perpendicularly with respect to the base portions 51 and 52. Lock portions 56a and 56b are respectively formed on the guide portions 55a and 55b. The lock portions 56a and 56b become locked to the casing 10 when the cover 50 is inserted into the vent 15.

When the cover 50 is inserted into the vent 15, the guide portions 55*a* and 55*b* are positioned so as to sandwich the fins 44 disposed on both outermost portions of the heat radiating fin 40, as shown in FIG. 4. Thus, the air blown by the cooling fan 30 can be controlled from leaking outside the heat radiating fin 40 and can be guided to the heat radiating fin 40. Thus, the heat radiating efficiency of the heat radiating fin 40 improves.

A preferred embodiment of the present invention has been described in detail above, but the present invention is not limited to this specific embodiment and is capable of being variously modified and changed within the scope of the gist of the invention set forth in the claims.

For example, the cover 50 may be attached to the casing 10 by another method, such as claws or screws, rather than by the lock portions 56*a* and 56*b*.

Further, the cover 50 and the guide portions 55*a* and 55*b* may also be separate parts rather than being integrated. In this case, the notebook computer 1 is equipped with a structure where a guide is first attached to the cooling fan 30, the heat radiating fin 40 or the casing 10, and then a cover is attached to the casing 10.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electronic apparatus comprising:
   a casing that includes a vent, with the vent venting dust inside the casing;
   a heat radiating fin that is housed in the casing and includes a fin edge portion; and
   a cooling fan that is housed in the casing and cools the heat radiating fin, with the cooling fan including a fan edge portion, the fan edge portion faces the fin edge portion of the heat radiating fin,
   wherein a clearance between the fin edge portion of the heat radiating fin and the fan edge portion of the cooling fan becomes narrower the further the clearance is from the vent, and
   wherein a projected view of a maximum width of the clearance between the fin edge portion and the fan edge portion is entirely within a width of the vent.

2. The electronic apparatus according to claim 1, wherein the fan edge portion of the cooling fan follows a vertical direction, and
   the fin edge portion of the heat radiating fin slants with respect to the fan edge portion of the cooling fan.

3. The electronic apparatus according to claim 1, further comprising a cover that covers the vent.

4. The electronic apparatus according to claim 3, wherein the cover includes guide portions that guide air blown by the cooling fan to the heat radiating fin.

5. The electronic apparatus according to claim 1, further comprising a display casing that is connected to the casing so as to be openable and closable, wherein the casing includes a keyboard.

6. A method of venting an electronic apparatus, comprising:
   providing a heat radiating fin that includes a fin edge portion;
   housing the heat radiating fin in a casing;
   providing a cooling fan with a fan edge portion, the fan edge portion faces the fin edge portion of the heat radiating fin;
   housing the cooling fan in the casing;
   providing a vent in the casing proximate to the fin edge portion and the fan edge portion;
   venting dust from an inside of the casing through the vent;
   cooling the heat radiating fin with the cooling fan; and
   narrowing a clearance between the fin edge portion of the heat radiating fin and the fan edge portion of the cooling fan in proportion to a distance from the vent,
   wherein a projected view of a maximum width of the clearance between the fin edge portion and the fan edge portion is entirely within a width of the vent.

* * * * *